Jan. 16, 1968  G. W. SWITZER, JR  3,364,125
WASTE HEAT FLASH EVAPORATOR IN LON PRESSURE
TURBINE CONDENSER SYSTEM
Filed Feb. 16, 1965
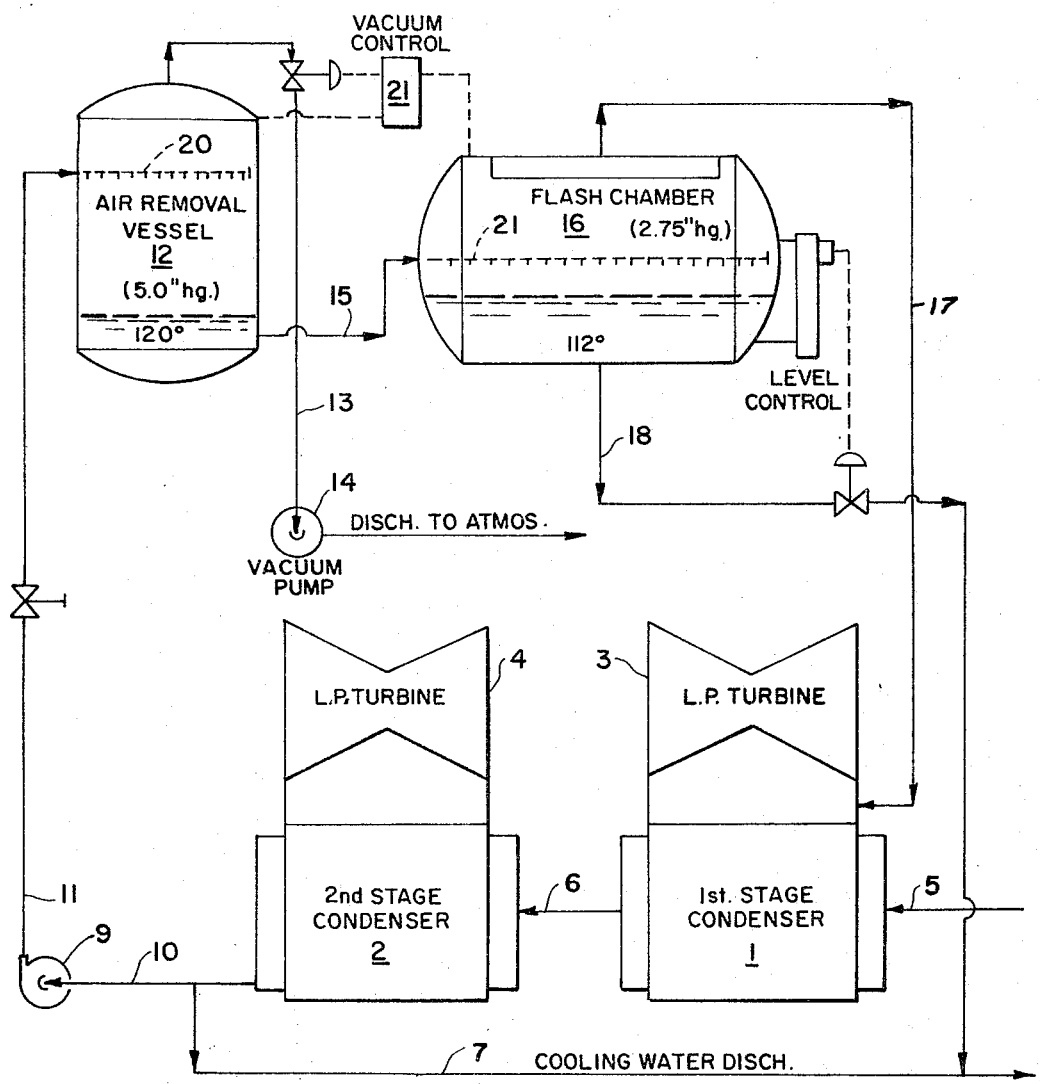
INVENTOR.
GEORGE W. SWITZER, Jr.
BY
*William J. Ruano*
his ATTORNEY United States Patent Office 3,364,125
Patented Jan. 16, 1968

3,364,125
WASTE HEAT FLASH EVAPORATOR IN
ION PRESSURE TURBINE CONDENSER
SYSTEM
George W. Switzer, Jr., Reading, Pa., assignor to
Gilbert Associates, Inc., Reading, Pa.
Filed Feb. 16, 1965, Ser. No. 433,121
2 Claims. (Cl. 202—160)

ABSTRACT OF THE DISCLOSURE

This invention relates to improvements in a power plant comprising first and second stage condensers having different vacuums in their shell sides and a cooling water system serially passing through both, thence to a cooling water discharge, the improvements comprising an air removal vessel connected to the second stage condenser, from which vessel dissolved gases are removed by a vacuum pump, after which the liquid is passed through a flash chamber, from which chamber flashed vapor discharge is led into the vapor space of the first stage low pressure turbine.

---

This invention relates to apparatus and a process for accomplishing the generation of high purity vapor from the waste heat in impure cooling liquid without the use of heat exchange apparatus or supplementary heat. The invention is applicable where cooling liquid is passed successively through vapor condensers with different vacuums in the shell sides of the successive condensers. Examples of this practice where water and water vapor are the fluids may be found in steam power plants and in saline water conversion plants. The invention may be also applicable, however, in other types of plants using water and with other liquids and vapors.

An outstanding disadvantage of conventional installations is that the impure condenser cooling liquid usually contains both dissolved salts and dissolved gases. The dissolved gases, to a large extent, separate from the liquid and, in the first stage, condenser, these gases interfere with achievement of good vacuum.

An object of the present invention is to provide an apparatus and method to prevent dissolved gases from entering the first stage condenser by removing them before the impure liquid enters the flash chamber.

Another object of the present invention is to increase the efficiency of a cooling system in a steam power plant or saline water conversion plant by the generation of high purity vapor from the waste heat in impure cooling liquid without the use of heat exchange apparatus or supplementary heat.

Other objects and advantages will become more apparent from a study of the following description taken with the accompanying drawing wherein:

The single figure is a schematic diagram of a power plant system embodying the present invention.

The purpose of the production of high purity vapor from impure water in a power plant is to replace losses of pure water from the system. The vapor is condensed to water in the normal process of the steam cycle and the pure vapor produced from the waste heat and impure water thus results in the production of pure water which may be equal to or in excess of the quantity of system losses at any given time. The excess production of pure water may be removed from the system for later or other use.

Referring more particularly to the drawing, there is shown two steam condensers 1 and 2 serving low pressure turbines 3 and 4, respectively. Cooling water is shown entering the first stage condenser at 5 and flowing successively through the first and second stage condensers connected by pipe 6 and to discharge pipe 7 which may be to a river, lake, pond, cooling tower, etc. The condensers, low pressure turbines, and cooling water piping are normal to power plant practice.

The apparatus involved in this invention consists of a pump 9 and piping 10 and 11 to convey discharge cooling water to an air removal vessel 12 served by a vacuum pump 14, piping 15 to convey the water from the air removal vessel 12 to a flash chamber 16, piping 17 to convey the flashed vapor to the first stage condenser 1 and piping 18 to convey the flashed liquid to the cooling water discharge pipe 7. Typical temperatures and pressures are shown on the drawing to illustrate the system operation which is as follows:

The cooling liquid leaving the second stage condenser 2 is usually at a temperature above the vapor condensing temperature of the first stage condenser. When this liquid is introduced into the flash chamber 16, the excess heat which its temperature represents will evaporate a portion of the liquid, cooling the remaining liquid correspondingly. The vapor thus produced will flow through pipe 17 into the vapor space of the first stage condenser, mixing with and being condenser with the vapor coming to the condenser from the turbine (or process).

The impure condenser cooling liquid usually contains both dissolved salts and dissolved gases. Since the solubilities of dissolved salts are quite high, they will remain dissolved in the liquid issuing from the flash chamber 16. Dissolved gases, however, will to a large extent separate from the liquid and mix with the flashed vapor going thence through pipe 17 to the first stage condenser 1. In the first stage condenser 1, these gases interfere with achievement of good vacuum. In order to prevent the dissolved gases from entering the first stage condenser, it is necessary to remove them before the impure liquid enters the flash chamber 16. This function is performed by the air removal vessel 12 and its vacuum pump 14. The warm, impure cooling liquid is introduced into the air removal vessel through holes in an internal pipe 20 so as to break up the liquid into drops. The vacuum in the air removal vessel is controlled by vacuum control means 21 so that the pressure in the vessel is slightly above the flash pressure of the incoming liquid, but considerably below the atmospheric pressure at which the gases originally became dissolved in the liquid. This reduction of pressure causes the major portion of dissolved gases to separate from the liquid and flow to the vacuum pump 14 for discharge to the atmosphere. The remaining portion of the gases still dissolved in the liquid will separate out of the liquid in the flash chamber and flow into the flasher vapor to the first stage condenser 1. The quantity of gases entering the first stage condenser will have been reduced so as to be of minimum deleterious effect on the function of the first stage condenser.

The particular arrangement shown with the pump 9 located in piping 10 is based on the elevation of the flash chamber 16 being sufficient that liquid will flow from the flash chamber to the cooling water discharge pipe 7 by gravity. If the flash chamber is at an insufficient elevation for gravity flow to the cooling water discharge pipe, pump 9 can be located in piping 18 as it would then not be necessary to use a pump in piping 11 to introduce the liquid into the air removal vessel.

Thus it will be seen that I have provided an efficient waste heat flash heat evaporator which will generate high purity vapor from the waste heat in impure cooling water without the use of heat exchange apparatus or supplementary heat; furthermore, I have provided an efficient power plant system including a waste heat flash evaporator for producing high purity vapor from impure water in the power plant to replace losses of pure water from the system.

While I have illustrated and described a single specific embodiment of my invention, it will be understood that this is by way of illustration only, and that various changes and modifications may be made within the contemplation of my invention and within the scope of the following claims.

I claim:

1. In a power plant comprising a low pressure turbine having a first stage condenser and a second low pressure turbine having a second stage condenser, said condensers having different vacuums in their shell sides, and a cooling water system serially connected to flow impure cooling feed water through said first and second stage condensers and thence to a cooling water discharge; the improvement comprising a by-pass waste heat flash evaporator system for generating high purity vapor from the waste heat in the impure cooling water to replace losses of pure water from the system without the use of heat exchange apparatus or supplemental heat, said last named system including an air removal vessel connected to said second stage condenser, said vessel including means connected thereto and comprising a conduit and pump means for passing said feed water from the second stage condenser and discharging the water into the top of the air removal vessel in the form of droplets, a vacuum pump connected to said vessel for discharging air and dissolved gases released from said droplets into the outside atmosphere, a flash chamber connected in series with said air removal vessel and having an unevaporated water discharge outlet connected to said cooling water discharge, said flash chamber also having a flashed vapor discharge outlet connected to the vapor space of said first stage low pressure turbine.

2. Apparatus as recited in claim 1 together with a pump connected between said second stage condenser and air removal vessel for pumping water into said vessel, and vacuum control means connected between said vessel and flash chamber for controlling the vacuum so that the pressure in said vessel is slightly above the flash pressure of the incoming liquid, but considerably below the atmospheric pressure at which the gases originally became dissolved in the liquid.

References Cited

UNITED STATES PATENTS

| | | | |
|---|---|---|---|
| 2,863,501 | 12/1958 | Fransworth | 203—11 X |
| 2,885,328 | 5/1958 | Williamson | 202—167 |
| 3,147,598 | 9/1964 | Wilson. | |
| 3,152,053 | 10/1964 | Lynam | 202—173 |
| 3,224,199 | 12/1965 | Best | 203—100 X |

FOREIGN PATENTS

| | | |
|---|---|---|
| 1,111,149 | 7/1961 | Germany. |

NORMAN YUDKOFF, *Primary Examiner.*

R. G. DRUMMOND, *Assistant Examiner*